June 14, 1949.  G. M. PETERSEN  2,473,173
OUTDOOR THEATRE LOUDSPEAKER SUPPORT POST
Filed June 29, 1945  2 Sheets-Sheet 1
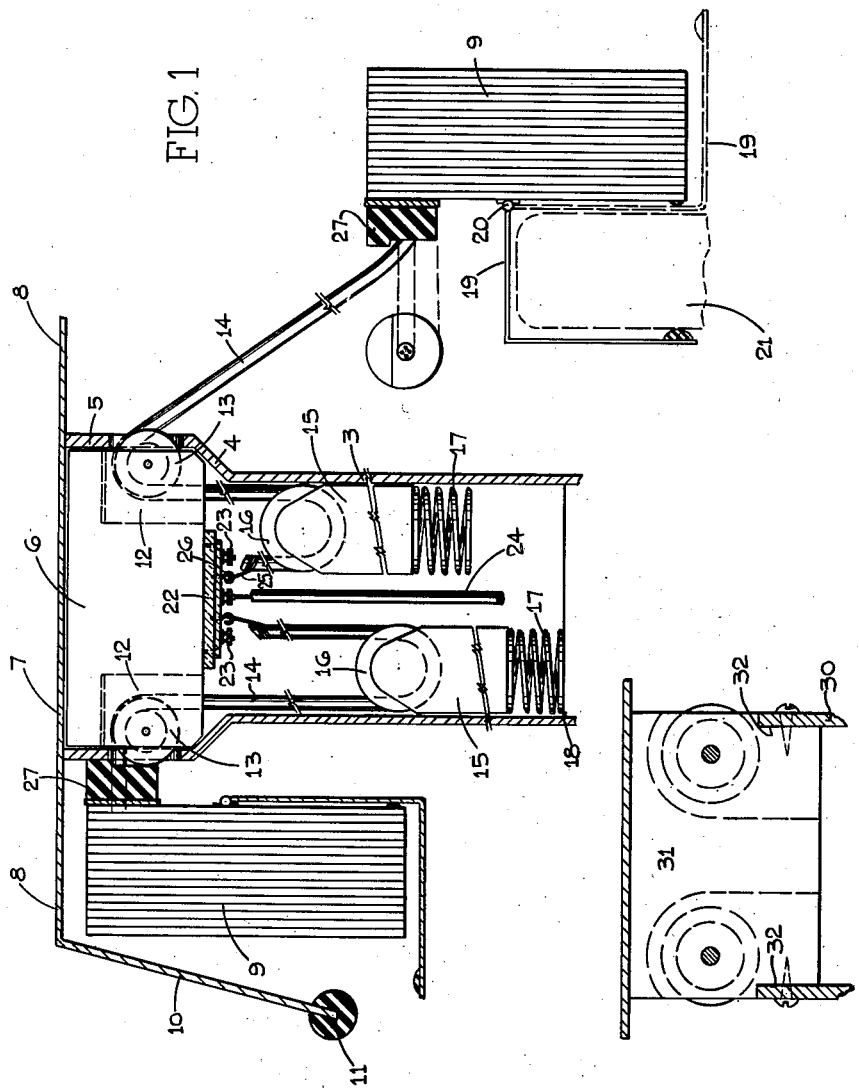
INVENTOR
GEORGE M. PETERSEN
BY
*Hangood & Van Horn*
his ATTORNEYS June 14, 1949.　　　　G. M. PETERSEN　　　　2,473,173
OUTDOOR THEATRE LOUDSPEAKER SUPPORT POST
Filed June 29, 1945　　　　　　　　　　　2 Sheets-Sheet 2

INVENTOR
GEORGE M PETERSEN
BY
his ATTORNEYS

Patented June 14, 1949

2,473,173

UNITED STATES PATENT OFFICE 2,473,173

OUTDOOR THEATRE LOUDSPEAKER SUPPORT POST

George M. Petersen, Cleveland, Ohio

Application June 29, 1945, Serial No. 602,287

4 Claims. (Cl. 179—150)

My invention relates to supports and more particularly to a support or stand for a loud speaker unit, such, for instance, as is adapted for use in drive-in theatres or other outdoor locations or stations. The invention further relates to such constructions whereby the unit, when not in use is automatically housed against and supported on a rigid support, although the speaker unit by means of a flexible connection with the support may be detached therefrom and supported on a door, window or other part of an automobile parked close to the support.

It is, therefore, one of the objects of the invention to provide a support of the above named character which will normally carry the speaker unit in a position readily accessible to the occupant of an automobile parked near the support and while in this position to provide means for protecting the unit against contact with moving objects in the vicinity of the support and to protect it against the weather.

Another object of the invention is to provide a speaker unit support with means whereby the unit may be extended from the support and supported on a door or window of an automobile adjacent to the support, such means being operable to automatically retract the speaker to its normal position on the unit support when released from the automobile.

Another object of my invention is to provide means within the unit support to reduce sudden shock and to prevent damage to the unit when the latter is released from its extended position on an automobile to its retracted position on the support.

Another object of the invention is to provide a device of the above named character which is extremely simple in construction, sturdy in use and easily operated.

Other objects and advantages of my invention will become more apparent as the following description of two embodiments thereof progresses, reference being made to the accompanying drawings in which like reference characters are employed to designate like parts throughout the same.

In the drawings:

Figure 1 is a vertical section through a support embodying my invention, showing the manner of supporting the speaker units on opposite sides of the support in a manner permitting them to be extended for use on or inside an automobile parked near the support. This view also illustrates a means for retracting the unit to its normal position along the supporting post and further illustrates one manner in which the drop of the counter-weight may be eased when the unit is retracted to its normal position on the support;

Figure 2 is a view partly in section of a modified form of post support and head construction;

Figure 3:
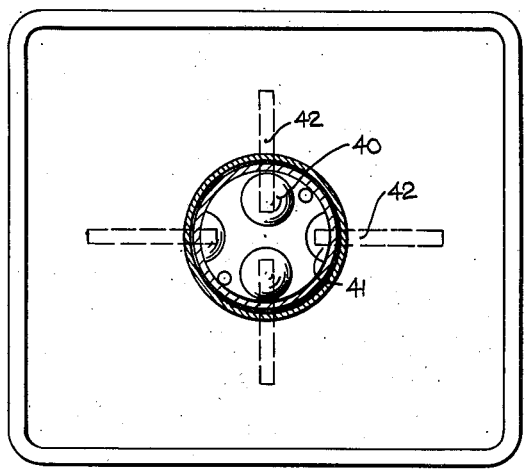
Figure 3 is a horizontal section through the supporting post of the type shown in either Figure 1 or Figure 2 and illustrates a modified form of cushioning means for the counter-weights when the unit is retracted to its normal position.
Figure 4:
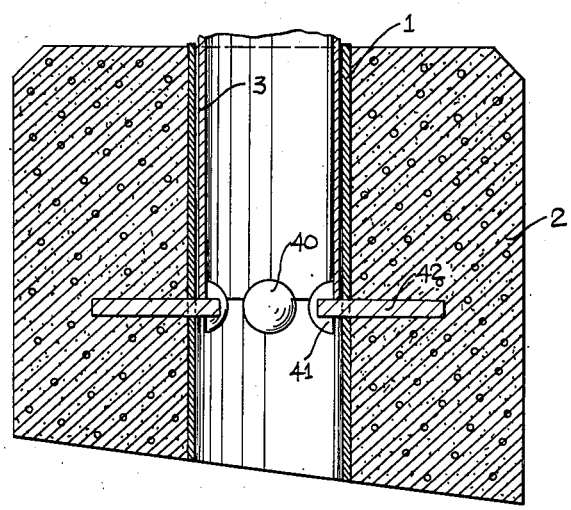
Figure 4 is a vertical section taken on the line IV—IV of Figure 3.

The sleeve 1 of the support may be set in a block of concrete 2, as shown in Figures 3 and 4, which is embedded in the ground at a desired location. The supporting post 3 preferably comprises a section of pipe which in Figure 1 may be of ceramic material and of sufficient wall thickness to impart the desired strength. The upper end of the pipe is flanged outwardly as at 4 and extends upwardly into a head portion 5 of enlarged diameter.

A head block 6 is fitted into the enlarged head portion 5 of the pipe section and rests on the inclined flanges 4 as shown in Figure 1. A cover plate 7 may be attached to overlie the block 6 and the enlarged head portion 5 of the support, the overlying portions 8 extending sufficiently beyond the head of the support to accommodate a speaker unit 9 therebeneath, the outer ends of the overlying portion 8 extending downwardly as at 10 and terminating in a resilient bumper, which may be made of rubber or the like, as at 11.

In the construction shown in Figure 1 the support is designed to accommodate two speaker units 9 normally supported on opposite sides of the post, as illustrated. The unit 9 shown on the right hand side of the view is extended to illustrate its position when it is in use and being supported on a door or window of an automobile parked adjacent to the post.

The head block 6 is provided with recesses 12 at opposite sides, within which are rotatably mounted suitable pulleys 13 over which the cables 14 ride in moving the unit toward or away from the post. Freely supported on the cables 14 and within the post are counter-weights 15 mounted on freely rotating pulley wheels 16, the weight of the counter-weight being sufficiently greater than the weight of the speaker unit 9 that when the unit is released from the automobile the weight will, by force of gravity, quickly return the unit 9 to its position against the post as shown in the left hand side of Figure 1.

In order to prevent damaging shock to the unit as it is quickly retracted to the post, I have provided in Figure 1 compression springs 17 carried by each of the counter-weights. At a predetermined point in the downward movement of the counter-weights which preferably is sufficiently low in the post to begin compression of the springs 17 when the unit 9 is closely approaching its housed position on the post, I provide a stop 18 against which the springs come to rest. This stop may be in the form of a concrete floor within the post or it may comprise a plurality of radially projecting members within the post lying rigidly in the downward path of the counter-weight and springs.

To enable the speaker unit to be readily attached and detached to an automobile door or window, I have provided a spring urged bracket 19 pivotally carried by the unit as at 20. In Figure 1 the bracket is shown in the right hand side of the figure as extended against the compression of the spring in the hinge 20 to overlie a car window sill 21, while in broken line position the bracket is shown in the position which it will automatically assume when the speaker unit is removed from the door and window frame of the automobile.

The cables 14 carry the necessary electrical connections to the respective speaker units and at the inner ends are connected to a suitable cross connecting block 22 mounted on the head block 6.

The block 22 is provided with suitable binding posts 23 to which the terminal ends of the wire in the cable are connected. The feeding cable 24 is connected to the proper binding post on the block 22 as illustrated in Figure 1. Tension applied to the cables 14 in moving the speaker unit to and from the post and also by virtue of the counter-weights is relieved from the wires in the cable by the cord or wire 25 connecting the cable directly to the block 22 as at 26.

In order further to ease the shock when the speaker unit 9 is released from an automobile and is brought to its normal position against the post, I have provided a resilient shock absorber 27 carried by the units and engageable against the enlarged end of the support as shown to the left in Figure 1.

Instead of employing a ceramic pipe or support as at 3 in Figure 1, the support may consist of a steel pipe 30. In this type of construction the head block 31 may be recessed at 32 on opposite sides thereof and may be fitted into the upper end of the pipe as shown in Figure 2.

In Figures 3 and 4, I have illustrated a modified form in which I have employed a different type of shock absorber means when the speaker units are allowed to be retracted. In this type of construction, shock and pressure springs 17 as shown in Figure 1 would be eliminated, inasmuch as the counter-weights in their downward movement will be impinged against the curved surfaces of the projecting members 40 and 41, respectively, which are arranged in diametrically opposite pairs within the support and in the path of movement of the counter-weights 15.

In this type of construction as shown in Figures 3 and 4, the members 40 and 41 are carried on the inner ends of the radially inwardly projecting bars 42. The bars 42 are embedded in the concrete base 2 and provide a sturdy and rigid support for the retarding members 40 and 41 within the support. As the counter-weights drop in the support they will engage the spherically curved surfaces of the members 40 and/or 41 and will be deflected, thus breaking the impact of the unit 9 against the support when it is retracted.

The members 40 and 41 may be of rubber, fibre, metal or any other material which is desirable. The bars 42 extending radially inwardly of the sleeve 1 also provide a base or stop against which the lower end of the post 3 may be supported, as shown in Figure 4.

Various changes may be made in the details of construction of my invention without departing from the spirit of the same or the scope of the appended claims.

I claim:
1. A support for loud speakers or the like comprising a hollow standard, a speaker unit adapted to be supported on the standard, a head block in said support, a flexible electrical cable connected to said block and to said unit to permit said units to be used at points remote from said support, and means acting on said cable normally to retract said unit to be supported on said support when released from said remote points, and means co-acting with said last named means to ease the return of said unit to said support.

2. A support for loud speakers or the like comprising an upright hollow member having a closed head portion, a loud speaker unit, and means connecting said unit to said support, said means permitting said unit to be extended beyond the support and automatically operable to return the unit to the support when said extended unit is released, and means within the support to reduce the shock of impact between the unit and support when the former is released, and a spring urged bracket on said unit for supporting said unit in its extended position on the body of an automobile or other object adjacent said support.

3. In a loud speaker support, a tubular body having its lower end embedded in a fixed base, a head block carried in its upper end, a pulley carried by said block, a loud speaker unit, a flexible cable connecting said unit with said head block and movable over said pulley, a counter-weight riding on said cable within the tubular body acting to normally carry the unit against the support, and means within the body engageable by the counter-weight in its downward movement to break its drop in returning the speaker unit to the support, said last named means comprising a plurality of radially disposed members within said body in the path of movement of said counter-weight.

4. In a loud speaker support, a tubular body having its lower end embedded in a fixed base, a head block carried in its upper end, a pulley carried by said block, a loud speaker unit, a flexible cable connecting said unit with said head block and movable over said pulley, a counter-weight riding on said cable within the tubular body acting to normally carry the unit against the support, and means within the body engageable by the counter-weight in its downward movement to break its drop in returning the speaker unit to the support, said last named means comprising a plurality of radially disposed members within said body in the path of movement of said counter-weight, said radially disposed members having enlarged end portions spaced apart to deflect and then permit the passage of the counter-weight therebetween during its downward movement.

GEORGE M. PETERSEN.

REFERENCES CITED

The following references are of record in the file of this patent:

UNITED STATES PATENTS

| Number | Name | Date |
| --- | --- | --- |
| 684,342 | Baker | Oct. 8, 1901 |
| 738,861 | Vought | Sept. 15, 1903 |
| 1,274,001 | Burns | July 30, 1918 |
| 2,143,966 | Yeager | Jan. 17, 1939 |